United States Patent [19]

Reilly

[11] 4,067,551
[45] Jan. 10, 1978

[54] GAS AND OIL MIXER

[76] Inventor: Edwin Reilly, 416 Lotz Ave., Altoona, Pa. 16602

[21] Appl. No.: 720,086

[22] Filed: Sept. 2, 1976

[51] Int. Cl.² .......................... B01F 13/00; B01F 5/12
[52] U.S. Cl. ..................................................... 366/332
[58] Field of Search ............... 259/112, 113, 123, 124, 259/101, 70, 71, DIG. 21, 27, 47; 417/430; 92/131; 239/142; 222/400.8, 402; 68/122

[56] References Cited

U.S. PATENT DOCUMENTS

| 722,833 | 3/1903 | Furlong | 259/113 |
|---|---|---|---|
| 1,052,549 | 2/1913 | Yearta | 259/113 |
| 1,450,238 | 4/1923 | Ayers | 259/113 |
| 2,307,616 | 1/1943 | Booth | 259/47 |
| 2,780,444 | 2/1957 | Hickey | 259/113 |
| 3,690,516 | 9/1972 | Vincent | 222/402 |

FOREIGN PATENT DOCUMENTS 284,783  12/1952  Switzerland ........................ 68/122

Primary Examiner—Robert W. Jenkins
Attorney, Agent, or Firm—Smith, Harding, Earley & Follmer

[57] ABSTRACT

A mixer for mixing oil and gasoline in a can comprising a mixer disc having a plurality of holes therein, a plunger shaft having its bottom end rigidly connected to the mixer disc, a guide sleeve adapted to be mounted in a mixer opening in the can, a lower spring mounted between the disc and a lower spring stop on the guide sleeve, a handle mounted on the top of the plunger shaft, and an upper spring mounted between the handle and an upper spring stop on the guide sleeve, whereby the handle is pumped up and down, assisted by the springs, to mix oil and gasoline for use in a snowmobile and the like.

7 Claims, 3 Drawing Figures

GAS AND OIL MIXER

BACKGROUND OF THE INVENTION

Two cycle engines, such as those used in snowmobiles and trail bikes, use a mixture of oil and gasoline as fuel. The usual procedure with snowmobiles is to carry a can of gasoline and a can of oil, pour a portion of the oil into the gasoline can, and mix the gasoline and oil by shaking the can to mix the contents. You must shake the can considerably in order to properly mix the gasoline and the oil together.

Prior mixing devices for various ingredients are shown in U.S. Pat. Nos. 722,833; 964,291; 2,481,352; and 2,499,203.

However, none of these prior devices are particularly adapted for mixing gasoline and oil in a gasoline can, and none of them show the structure of my new mixer for gasoline and oil.

BRIEF SUMMARY OF THE INVENTION

My invention relates to a mixer for gasoline and oil which includes springs to assist in the pumping action so as to thoroughly mix the oil and gasoline with a minimum of effort, and which includes a dual-purpose handle adapted for carrying and for pumping.

DETAILED DESCRIPTION

Figure 1:
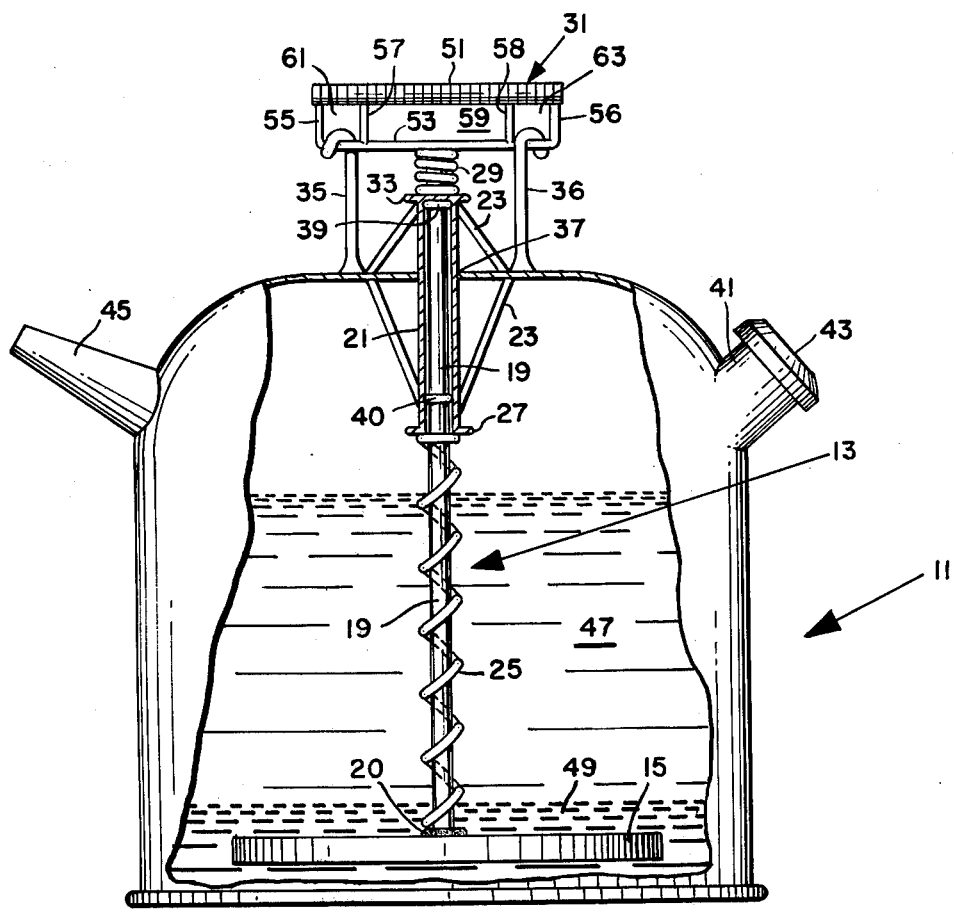
FIG. 1 is a view in side elevation, with parts broken away, of my mixer positioned in a gasoline can with its handle in locked, carrying position.
Figure 2:
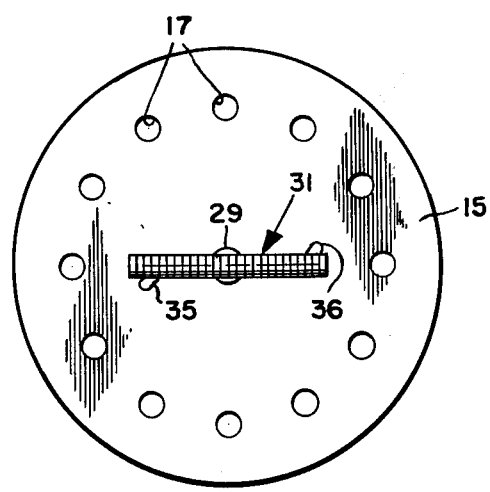
FIG. 2 is a top plan view of the mixer shown in FIG. 1.
Figure 3:
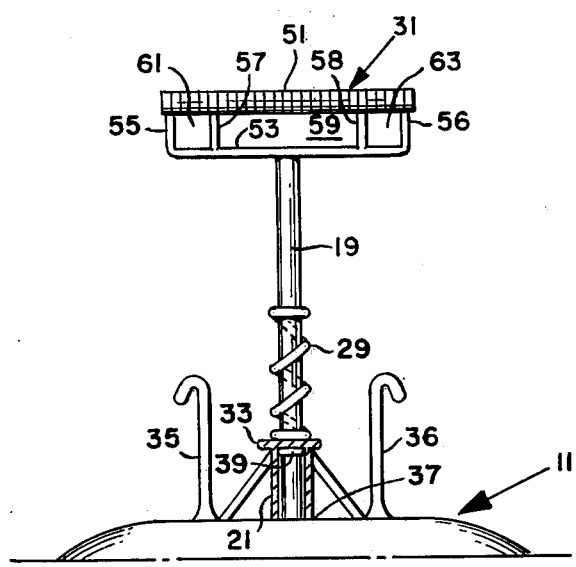
FIG. 3 is a partial view in elevation showing the handle in unlocked pumping position.

A gasoline can 11 is adapted to receive my mixer 13 for mixing gasoline and oil together, which comprises a mixer disc 15 having a plurality of holes 17 therein, a plunger shaft 19 having its bottom end 20 rigidly connected to the mixer disc 15, a guide sleeve 21 which is mounted in the top of can 11 by braces 23, a lower spring 25 connected between disc 15 and a lower spring stop 27 on guide sleeve 21, and an upper spring 29 mounted between a handle 31 and an upper spring stop 33 on guide sleeve 21.

A pair of handle lock-down hook members 35 and 36 are provided above can opening 37 for locking the handle 31 when the can contents are being stored. Hook members 35, 36 face in opposite directions so as to catch both ends of handle 31 when it is rotated into locked position.

A pair of resilient seals 39, 40 are provided between plunger shaft 19 and guide sleeve 21. Can 11 is also provided with an intake port 41 and cap 43, and with a spout 45 for pouring.

FIG. 1 shows the gasoline 47 floating above the oil 49 in the usual fashion before mixing, with the proportions of gasoline to oil being the conventional 20 to 1, 5 gallons of gasoline to 1 quart of oil.

Handle 31 includes a grip portion 51 connected to a bottom member 53 by vertical members 55, 56. Bottom member 53 is attached to the top end of plunger shaft 19. A pair of vertical dividers 57, 58 extend between grip portion 51 and bottom member 53 and are located inboard of vertical members 55. Dividers 57, 58 protect the fingers of your hand when turning the handle 31 into and out of hold-down position. Grip portion 51, vertical dividers 57, 58, and bottom member 53 form a finger-receiving space 59 which receives the fingers of the hand.

Grip portion 51, vertical member 55, bottom member 53, and divider 57 form a hook opening 61 for receiving the hook of handle lock-down member 35, while grip portion 51, vertical member 46, bottom member 53, and divider 58 form a hook opening 63 for receiving the hook of handle lock-down member 36

In operation, to mix the gasoline and oil, the handle 31 is pushed down and turned to release it from the hooks of members 35, 36. Then the handle 31 is pumped up and down, assisted by the springs 25 and 29, to thoroughly mix the gasoline and oil with a minimum of effort. After mixing is completed, the handle 31 is pushed down and turned into the hooks of lock-down members 35, 36.

Upper spring 29 absorbs shock when you are pumping the mixer 13.

After mixing, handle 31 is secured in hold-down position by pressing handle 31 downwardly to compress the spring 29, and by turning the handle 31 so that hook openings 61, 63 catch the hooks of the hold-down members 35, 36 which are permanently affixed to the can 11 and are facing in opposite directions.

Lower spring 25 is of a medium strength as to allow the mixer 13 to raise and lower easily for speedy mixing. Spring 25 may be approximately nine inches long, 0.060 gauge wire, with three coils per inch. When spring 25 is totally compressed, it takes up about 1⅜ inches.

I claim:

1. A mixer for mixing oil and gasoline in a can comprising:
    a mixer disc having a plurality of holes therein,
    a plunger shaft having its bottom end rigidly connected to the mixer disc,
    plunger guide means adapted to be mounted in a mixer opening in the can,
    a lower spring mounted between the disc and a lower spring stop on the guide means and biasing the plunger shaft downwardly,
    a handle mounted on the top of the plunger shaft,
    and an upper spring mounted between the handle and an upper spring stop on the guide means for biasing the plunger shaft upwardly,
    whereby the handle is pumped up and down, assisted by the springs, to mix oil and gasoline for use in a snowmobile and the like.

2. The mixer of claim 1 wherein said plunger guide means is a guide sleeve.

3. The mixer of claim 2 including braces for mounting the guide sleeve in said mixer opening.

4. The mixer of claim 1 including handle lock-down means mounted on said can for locking the handle onto the can.

5. The mixer of claim 1, said handle including a grip portion connected to a bottom member by vertical members, said bottom member being attached to the top end of the plunger shaft, a pair of vertical dividers extending between the grip portion and the bottom member and located inboard of said vertical members, said dividers protecting the fingers of the operator's hand when turning the handle into and out of hold-down position, with said grip portion, vertical dividers, and bottom member forming a finger-receiving space which receives the fingers of the hand.

6. The mixer of claim 5, said handle grip portion, one of said vertical members, said bottom member, and one of said dividers forming a hook opening for receiving a hook of the handle lock-down means.

7. The mixer of claim 1,
said plunger guide means being a guide sleeve,
including braces for mounting the guide sleeve on said can,
handle lock-down means mounted on the can for locking the handle onto the can,
said handle including a grip portion connected to a bottom member by vertical members,
said bottom member being attached to the top end of the plunger shaft,
a pair of vertical dividers extending between the grip portion and the bottom member and located inboard of said vertical members,
said dividers protecting the fingers of the operator's hand when turning the handle into and out of hold-down position,
with said grip portion, vertical dividers, and bottom member forming a finger-receiving space which receives the fingers of the hand,
and said handle grip portion, one of said vertical members, said bottom member, and one of said dividers forming a hook opening for receiving a hook of the handle lock-down means.

* * * * *